(12) United States Patent
Wagh et al.

(10) Patent No.: US 11,025,678 B2
(45) Date of Patent: Jun. 1, 2021

(54) AXI INTERCONNECT MODULE COMMUNICATION NETWORK PLATFORM

(71) Applicant: Seagate Technology LLC, Cupertino, CA (US)

(72) Inventors: Sneha Kishor Wagh, Pune (IN); Siddharth Shirish Suttraway, Mumbai (IN)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 299 days.

(21) Appl. No.: 15/879,982

(22) Filed: Jan. 25, 2018

(65) Prior Publication Data

US 2019/0230134 A1    Jul. 25, 2019

(51) Int. Cl.
| | |
|---|---|
| *G06F 15/16* | (2006.01) |
| *H04L 29/06* | (2006.01) |
| *G06F 9/38* | (2018.01) |
| *G06F 3/06* | (2006.01) |

(52) U.S. Cl.
CPC ........ *H04L 65/1069* (2013.01); *G06F 3/0635* (2013.01); *G06F 9/3897* (2013.01); *H04L 65/1073* (2013.01); *H04L 65/80* (2013.01); *H04L 69/22* (2013.01)

(58) Field of Classification Search
CPC ....... H04L 47/10; H04L 47/32; H04L 49/102; H04L 49/555; H04L 49/9073
USPC ................ 709/238, 249–250, 224, 229–230, 709/234–236, 245–246
See application file for complete search history.

(56) References Cited

U.S. PATENT DOCUMENTS

| | | | |
|---|---|---|---|
| 8,612,648 B1 | 12/2013 | Murray | |
| 2011/0082970 A1* | 4/2011 | Rohleder | G11C 29/74 711/104 |
| 2011/0302345 A1 | 12/2011 | Boucard et al. | |
| 2012/0159088 A1 | 6/2012 | Balkan et al. | |
| 2013/0028261 A1 | 1/2013 | Lee | |
| 2013/0031284 A1* | 1/2013 | Yun | G06F 1/3237 710/105 |
| 2014/0281081 A1 | 9/2014 | Lunadier et al. | |

(Continued)

FOREIGN PATENT DOCUMENTS

KR    20100115377 A    10/2010

*Primary Examiner* — Farzana B Huq
(74) *Attorney, Agent, or Firm* — Holzer Patel Drennan

(57) ABSTRACT

Implementations described and claimed herein provide methods and systems for routing data, message, and register access transactions through common ports in an on-chip interface interconnect module while supporting Quality of Service (QoS) and maintaining fair data throughput. In one implementation, a System on Chip system includes an AXI interconnect module to route data, message, and register access transactions via common ports in the AXI interconnect module. The system may include at least one master circuit module configured to initiate data transaction, wherein the at least one master circuit module behaves as a slave to receive message transactions and register access transactions. The system may include at least one slave circuit module configured to respond to data transactions, wherein the at least one slave circuit module behaves as a master to initiate message transactions. The system may use QoS signaling as a priority indicator to prioritize the transactions.

10 Claims, 5 Drawing Sheets

(56) References Cited

U.S. PATENT DOCUMENTS

2015/0339424 A1* 11/2015 Chang ................... G06F 30/39
 716/136
2018/0052790 A1* 2/2018 Naylor ................. G06F 13/362
2018/0157553 A1* 6/2018 Ryu .................... G06F 11/0736

* cited by examiner

AXI INTERCONNECT MODULE COMMUNICATION NETWORK PLATFORM

BACKGROUND

In System on Chip architecture, functional blocks communicate with each other through the network on chip. Network on chip is the layout established that allows circuit modules on a chip to share information in the form of data or messages with each other. Embedded processors may initiate transactions within the chip or may control the transactions by accessing the hardware peripheral registers.

There are separate routing schemes developed to route data transactions, message transactions, and register access transactions independently. As the transactions are independent with respect to each other, separate interconnect module development for each set of transactions is required.

Each set of network transactions are required to manage factors, such as latency, bandwidth occupation, and throughput that, together, can be referred as overall quality of service of the network design.

SUMMARY

Implementations described and claimed herein provide methods and systems for routing data transactions, message transactions, and register access transactions through common ports in an on-chip interface interconnect module while supporting Quality of Service (QoS) and maintaining fair data throughput. In one implementation, a System on Chip system includes an AXI interconnect module to route data transactions, message transactions, and register access transactions via common ports in the AXI interconnect module. The system may include at least one master circuit module configured to initiate data transaction, wherein the at least one master circuit module behaves as a slave to receive message transactions and register access transactions. The system may include at least one slave circuit module configured to respond to data transactions, wherein the at least one slave circuit module behaves as a master to initiate message transactions. The system may use QoS signaling as a priority indicator to prioritize the transactions.

This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Descriptions of various implementations as further illustrated in the accompanying drawings and defined in the appended claims. These and various other features and advantages will be apparent from a reading of the following detailed descriptions. Other implementations are also described and recited herein.

BRIEF DESCRIPTIONS OF THE DRAWINGS

DETAILED DESCRIPTIONS

Different network layout schemes are used in System on Chip (SOC) development to route different sets of transactions. In some implementations, there may be proprietary network establishments to route the messages in a system. As the register accesses do not need to follow a throughput requirement, register access transactions are either channelized through a separate set of networks or the register accesses transactions may be channelized through a data path network itself. Data path channels are developed to handle burst transactions and register accesses are designed to route the transactions which are smaller in size. Thus, if register accesses are passed through the data path network, bridge development may be required to handle register access transactions, which will not hamper the overall latency of the system.

The network schemes can lead to development of a proprietary network establishment which can increase the time to market a chip or leads to the development of complex bridges to match network latency. Further, different sets of network layouts in a chip can increase the overall signal routing in a chip. As a result, there may be signal congestion issues within the SoC. As the number of hardware blocks increase, the number of ports to route each type of network increases in the system. Overall, the area of the chip also increases significantly to manage the routing mechanism. Such type of network development schemes does not efficiently use the availability of a standard network framework, such as Advanced eXtensible interface (AXI).

The disclosed systems and methods include an on-chip interface interconnect module communication network platform that can be used to route different sets of signals through a common interconnect module that implements a resource sharing approach in design. The disclosed systems and methods support high-performance, high-frequency system designs, provide high frequency operations without using complex bridges, and also meet the interface requirement of a wide range of components. The disclosed systems and methods have flexibility in implementing the interconnect module architectures.

The disclosed AXI interconnect module provides separate address and data paths that can be routed independently. In some implementations, the AXI interconnect module includes user defined signals or a Quality of Service (QoS) signal, which can be used by an AXI master as a priority indicator for an associated write transaction or read transaction. Routing the different set of signals through the common AXI interconnect module guarantees fairness among the transactions and also guarantees fair data throughput. The ports used to route the data transactions, message transactions, and register access transactions are common require a lower number of signals to be routed.

Figure 1:
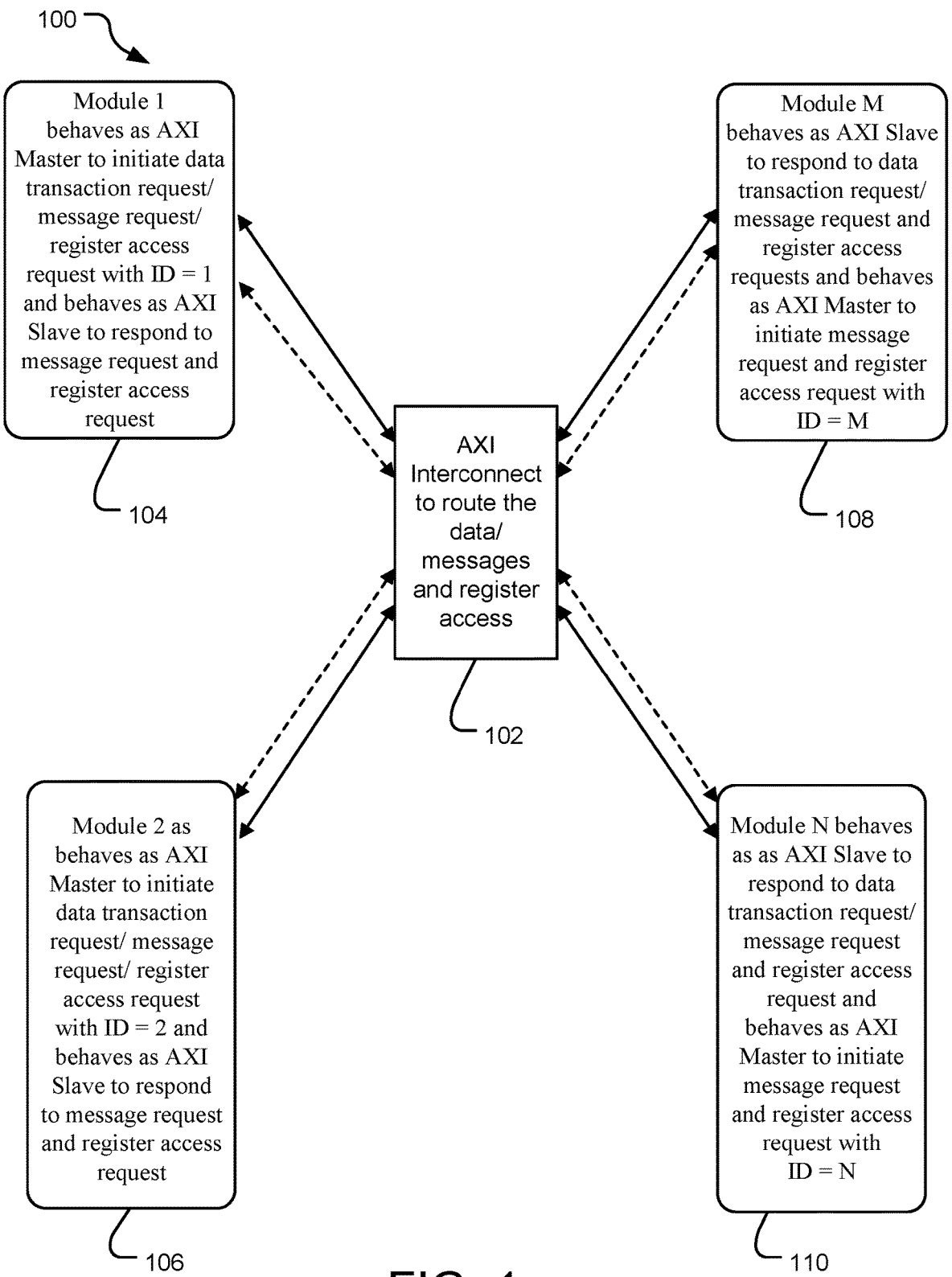
FIG. 1 illustrates a block diagram of an example Advanced eXtensible interface interconnect module network.

FIG. 1 illustrates a block diagram 100 of an example Advanced eXtensible interface interconnect module network. An AXI interconnect module 102 routes data transactions, message transactions, and register access transactions.

The Advanced eXtensible interface interconnect module network may include a master circuit module configured to initiate data transactions. The master circuit module may also behave as a slave to receive message transactions and register access transactions. The system may include at least one slave circuit module configured to respond to data transactions. The slave circuit module can also behave as a master to initiate message transactions.

Referring to FIG. 1, the Advanced eXtensible interface interconnect module network includes a Module 1 104 and a Module 2 106. The Module 1 104 behaves as AXI Master to initiate data transaction requests, message requests, and register access requests with ID=1 and behaves as an AXI Slave to respond to message requests and register access requests. The Module 2 106 behaves as an AXI Master to initiate data transaction requests, message requests, and register access requests with ID=2 and behaves as an AXI Slave to respond to message requests and register access requests.

The Advanced eXtensible interface interconnect module network also includes a Module M 108 and a Module N 110. The Module M 108 behaves as an AXI Slave to respond to data transaction requests, message requests, and register access requests, and behaves as an AXI Master to initiate message requests and register access requests with ID=M. The Module N 110 behaves as an AXI Slave to respond to data transaction requests, message requests, and register access requests, and behaves as an AXI Master to initiate message requests and register access requests with ID=N.

Figure 2:
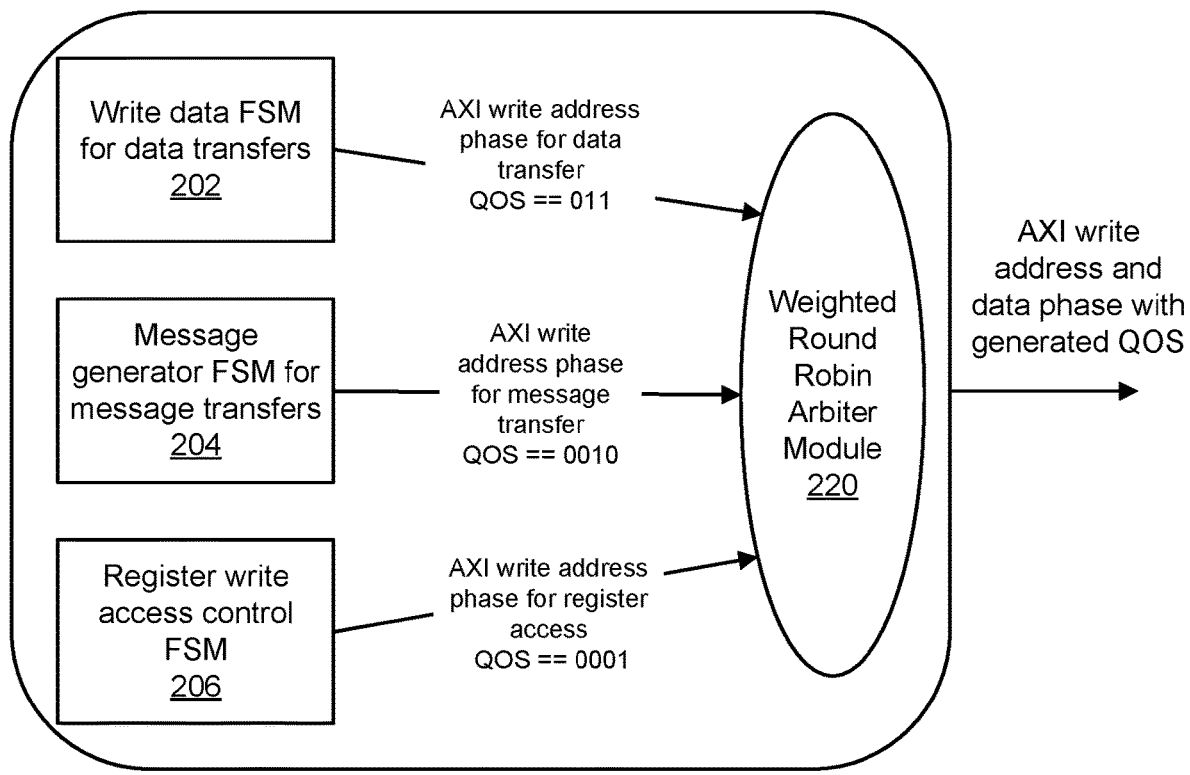
FIG. 2 illustrates a block diagram of an example master with QoS signaling for write transfers in an AXI Interconnect module system.

FIG. 2 illustrates a block diagram 200 of an example master with QoS signaling for write transfers in an AXI Interconnect module system. In some implementations, an AXI interconnect module in the disclosed technology is designed to support the burst and high performance transactions, as well as transfer the message and register transfers. As data transactions have high performance and low latency, it is a higher priority to transfer data transactions through a network than that of messages and register access transfers.

In some implementations, the AXI interconnect module network has QoS (Quality of Service) signaling. The AXI interconnect module network may be extended to support a two 4-bit QoS identifier. The QoS signaling is transferred through the write and read address channels. QoS signaling may be used as a priority indicator for associated transactions, allocating priority dynamically. Specifically, data transactions can be initiated with high priority, and message transactions and register access transactions can be initiated with low priority.

In some implementations, the AXI interconnect module network includes a master, which includes programmability to produce its own QoS values. In some implementations, a master component may not support a programmable QoS scheme, and can use QoS values that represent relative priorities of the transactions the master generates. In one example, a master that cannot produce its own QOS values may use the default value as "4'b0000."

Referring to FIG. 2, a weighted round robin arbiter module 220, a network arbitration method, latches a request from each sub block (e.g., a data transactions block 202, a message transactions block 204, and a register access transactions block 206) when each sub block generates a write address phase via a Finite-state machine (FSM), and until the entire write data gets transferred.

The weighted round robin arbiter module 220 assigns a high weight (e.g., QoS=011) to the data transactions block 202, a medium weight (e.g., QoS=0010) for the message transactions block 204, and a low weight (e.g., QoS=0001) for the register access transactions block 206. In order of priority, the AXI write transfer includes the AXI write address phase and AXI Write data phase. A slave can send back the AXI write response transaction upon receiving the write data.

Figure 3:
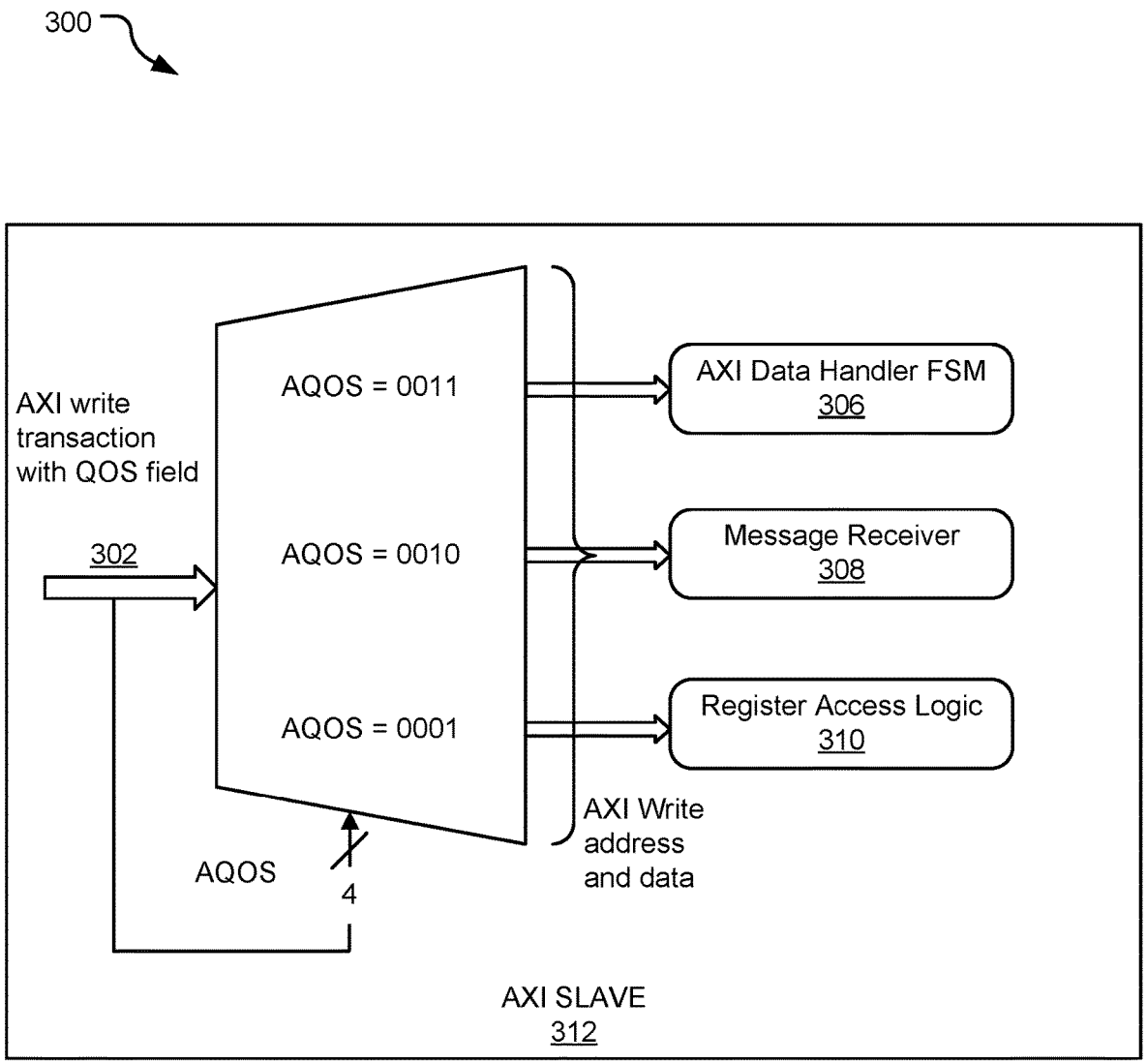
FIG. 3 illustrates a block diagram of an example slave decoding a transaction in an AXI Interconnect module system.

FIG. 3 illustrates a block diagram 300 of an example slave 312 decoding a data transaction, a message transaction, and a register access transaction in an AXI Interconnect module system. To route a message, a write transaction 302 is initiated by a master. A QoS field is decoded by an AXI Slave 312 to route the transaction to respective sub modules in the AXI Slave 312 to modules further handling data transactions, message transactions or register access transactions. For example, if the transaction received has an AwQOS field as 4'b0011, then the slave passes the transaction to the main data handler FSM 306. If the AwQoS==4'b0010, then the slave decodes the write transaction as a message transaction to a message receiver 308. If the transaction received has an AwQOS field as 4'b0001, then the slave passes the transaction to a Register Access Logic 310.

Figure 4:
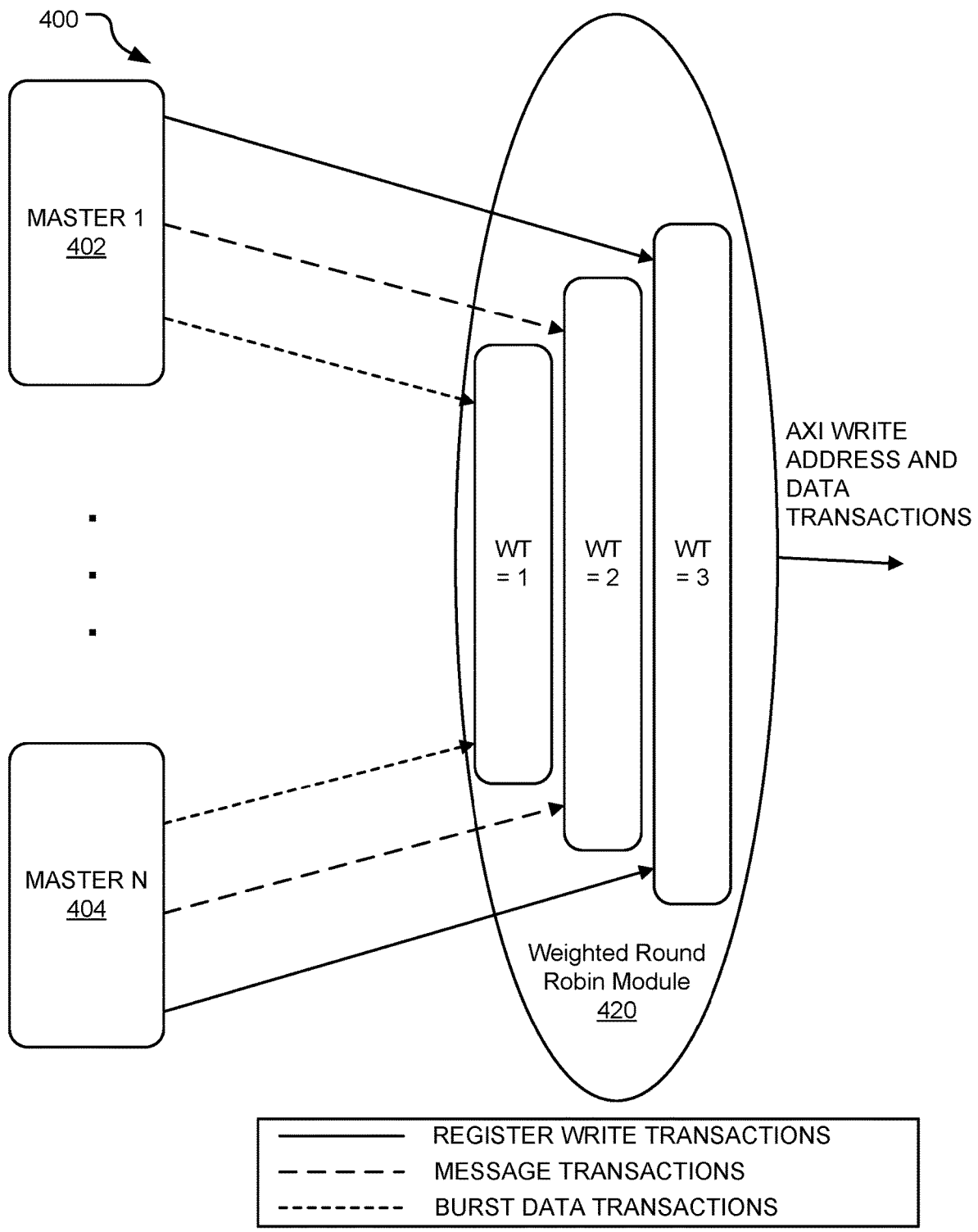
FIG. 4 illustrates a block diagram of an example Advanced eXtensible interface interconnect module network.

FIG. 4 illustrates a block diagram of an example AXI Interconnect module system 400. An AXI interconnect module is responsible for routing data, messages, and register accesses initiated by AXI Masters to the appropriate AXI Slaves. For example, as shown, a Master 1 402 to Master N 404 are responsible in initiating data transactions, message transactions, or register access transactions. The AXI Interconnect module system 400 includes a weighted round robin module 420, which implements a fair arbitration method. Maintaining fairness for these different types of transfers and providing fair data throughput is a key challenge in interconnect module development. Arbitration plays a vital role when fairness is considered. The weighted round robin arbiter module 420 controls the percentage of output port bandwidth allocated to a service class. All transactions routed through the common fabric can be divided into different service classes.

In some implementations, an AXI write data transactions fall under a category of a service class that requires major bandwidth, low latency and high performance. A high weight is assigned to these transactions. Message transactions falls under a category of a service class that requires moderate bandwidth (based upon message length), low latency and moderate performance. A medium weight is assigned to these transactions. Register write transactions require less bandwidth (register control programming or clearing the interrupt); low performance and a latency requirement can be relaxed. A low weight is assigned to these transactions.

Referring to FIG. 4, depending upon the expected performance requirement for the data transfers, weights can be assigned by the weighted round robin module 420. For example, a weight for a write data transfer is 3, a weight for a message transfer is 2 and a weight for a register access is 1.

In one implementation, a data transfer burst length may be 128 bytes, a message transfer length may be 16 bytes, and a register transfer length may be 4 bytes. Data, messages and register accesses are accessed independently. Data throughput is 128 bytes/16 clock cycles and AXI data width is 8 bytes. It can take 64 clock cycles to transfer four 128 byte transactions. In some implementations, there may be more transactions in queue at each interface than are granted a weight. For example, there may be four back to back data transfers, three back to back message transactions, and two back to back register transfers pending, as the data transfers are performance critical. With the disclosed technology, four back to back data transfers each of 128 bytes will take 70 clock cycles when the AXI interconnect module is common for all transfers.

Figure 5:
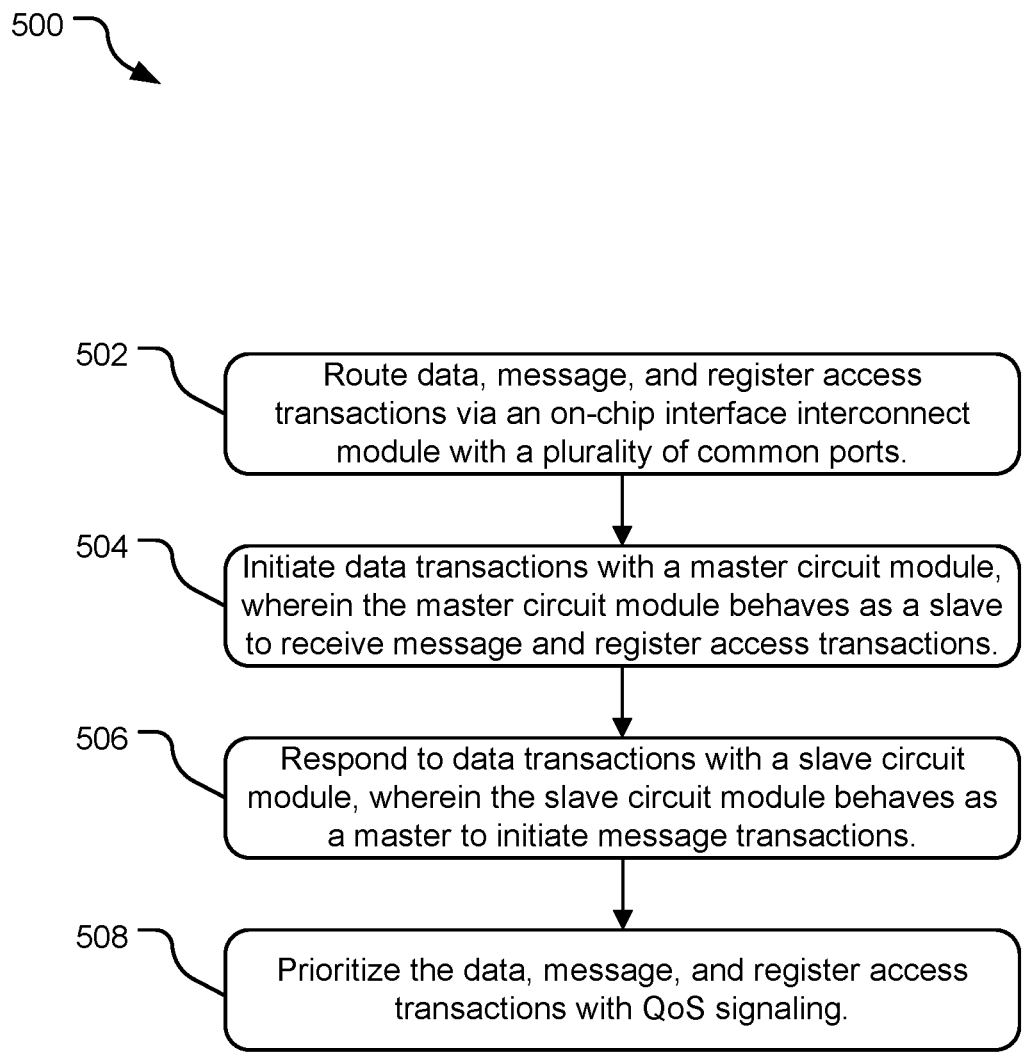
FIG. 5 is a flowchart of example operations of an Advanced eXtensible interface interconnect module network.

FIG. 5 is a flowchart of example operations of an example AXI Interconnect module system. An operation 502 routes data transactions, message transactions, and register access transactions via an on-chip interface interconnect module with a plurality of common ports. In some implementations, the on-chip interconnect module comprises an Advanced eXtensible interface interconnect module.

An operation 504 initiates data transactions with a master circuit module. The master circuit module also behaves as a slave to receive message transactions and register access transactions. An operation 506 responds to data transactions with a slave circuit module. The slave circuit module also behaves as a master to initiate message transactions.

An operation 508 prioritizes the data transactions, the message transactions, and the register access transactions with Quality of Service (QoS) signaling as a priority indicator. The QOS signaling may be transferred through write and read address channels. In some implementations, the operation 508 prioritizes the data transactions with a high priority status, the message transactions with a medium priority status, and prioritizing the register access transactions with a low priority status.

The disclosed AXI interconnect module, master and slave design operation guarantees the fair throughput for the data transfers and makes use of available AXI interconnect module efficiently. The scheme can be used by firmware to dynamically adjust the weights assigned to different service classes to gain the high performance and low latency. The number of ports are reduced. Routing wires are reduced as there's no need to develop dedicated networks and interconnect modules to route the message and register accesses.

The logical operations making up the embodiments described herein are referred to variously as operations, steps, objects, or circuit modules. Furthermore, it should be understood that logical operations may be performed in any order, unless explicitly claimed otherwise or a specific order is inherently necessitated by the claim language.

The above specification, examples, and data provide a complete description of the structure and use of example embodiments described herein. Since many alternate embodiments can be made without departing from the spirit and scope of the embodiments described herein, the invention resides in the claims hereinafter appended. Furthermore, structural features of the different embodiments may be combined in yet another embodiment without departing from the recited claims. The implementations described above and other implementations are within the scope of the following claims.

What is claimed is:

1. An integrated circuit system comprising a system on chip (SoC), the SoC comprising:
    an on-chip interface interconnect circuit module with a plurality of common ports, the on-chip interface interconnect module configured to route data transactions, message transactions, and register access transactions via the common ports; and
    a weighted round robin arbitration module operative to implement a weighted round robin arbitration method by dividing the data transactions, message transactions, and register transactions into different respective service classes and allocating port bandwidth of the common ports based on weights assigned to each of the service classes, wherein Quality of Service (QoS) signaling is used as a priority indicator to the weighted round robin arbitration module for the dividing the data transactions, message transactions, and register transactions into different respective service classes to prioritize the data transactions, the message transactions, and the register access transactions in relation to the allocation of the port bandwidth of the common ports based on weights assigned to each of the service classes; and
    at least one master circuit module configured to initiate a data transaction, wherein the at least one master circuit module behaves as a slave to receive message transactions and register access transactions.

2. The system of claim 1, wherein the on-chip interface interconnect module further comprises an Advanced eXtensible interface interconnect module network.

3. The system of claim 1, further comprising at least one slave circuit module configured to respond to data transactions, wherein the at least one slave circuit module behaves as a master to initiate message transactions.

4. The system of claim 1, wherein the QoS signaling is transferred through write and read address channels.

5. The system of claim 1, wherein the on-chip interconnect module interface supports two 4-bit QoS signaling.

6. A method comprising:
    routing data transactions, message transactions, and register access transactions via an on-chip interface interconnect module with a plurality of common ports;
    prioritizing the data transactions, the message transactions, and the register access transactions with Quality of Service (QoS) signaling as a priority indicator for the dividing of the data transactions, message transactions, and register transactions into different respective service classes;
    dividing the data transactions, message transactions, and register transactions into different respective service classes; and
    allocating port bandwidth of the common ports based on weights assigned to each of the service classes by a weighted round robin arbiter module for the routing of the data transactions, message transactions, and register access transactions via the plurality of common ports; and
    initiating data transactions with at least one master circuit module, wherein the at least one master circuit module behaves as a slave to receive message transactions and register access transactions.

7. The method of claim 6, further comprising:
    responding to data transactions with at least one slave circuit module, wherein the at least one slave circuit module behaves as a master to initiate message transactions.

8. The method of claim 6, wherein the on-chip interface interconnect module comprises an Advanced eXtensible interface interconnect module.

9. The method of claim 6, further comprising:
    prioritizing the data transactions with a high priority status having a high weight;
    prioritizing the message transactions with a medium priority status having a medium weight; and
    prioritizing the register access transactions with a low priority status having a low weight.

10. The method of claim 6, further comprising:
transferring the QOS signaling through write and read address channels.

\* \* \* \* \*